(12) United States Patent
Bouru

(10) Patent No.: US 7,695,194 B2
(45) Date of Patent: Apr. 13, 2010

(54) MEMBER FOR THE GUIDANCE OF A MOVABLE PIECE

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 1140 days.

(21) Appl. No.: 11/319,133

(22) Filed: Dec. 28, 2005

(65) Prior Publication Data

US 2006/0147139 A1    Jul. 6, 2006

(30) Foreign Application Priority Data

Jan. 6, 2005    (FR) .................................. 05 00097

(51) Int. Cl.
*F16C 33/24*    (2006.01)
*F16C 33/02*    (2006.01)
*F16C 27/06*    (2006.01)

(52) U.S. Cl. ...................... 384/297; 384/222; 384/276; 384/907.1

(58) Field of Classification Search ................... 384/91, 384/98, 106, 117, 129, 212, 220, 222, 272–276, 384/279, 297, 308, 312, 901–912

See application file for complete search history.

(56) References Cited

U.S. PATENT DOCUMENTS

| | | | | |
|---|---|---|---|---|
| 2,758,892 A | * | 8/1956 | Wallgren ..................... | 384/302 |
| 3,428,374 A | * | 2/1969 | Hudacko et al. ............. | 384/213 |
| 3,578,828 A | * | 5/1971 | Orkin et al. .................. | 384/129 |
| 3,604,768 A | * | 9/1971 | Decker ........................ | 384/309 |
| 3,687,506 A | * | 8/1972 | Dee ............................. | 384/117 |
| 3,711,171 A | * | 1/1973 | Orkin et al. .................. | 384/297 |
| 4,410,285 A | * | 10/1983 | Strasser et al. .............. | 384/297 |
| 4,515,486 A | * | 5/1985 | Ide ............................. | 384/117 |
| 4,526,482 A | * | 7/1985 | Ide ............................. | 384/104 |
| 4,664,595 A | | 5/1987 | Tsuji et al. | |
| 4,892,419 A | * | 1/1990 | Inoue et al. ................. | 384/322 |
| 5,006,043 A | * | 4/1991 | Katsumata et al. .......... | 415/113 |
| 5,017,022 A | * | 5/1991 | Ruggles et al. ............. | 384/118 |
| 5,033,871 A | * | 7/1991 | Ide ............................. | 384/98 |
| 5,102,239 A | * | 4/1992 | Momose et al. ............. | 384/276 |
| 5,533,813 A | * | 7/1996 | Makino et al. .............. | 384/292 |
| 5,800,068 A | | 9/1998 | Wanger | |
| 5,839,880 A | * | 11/1998 | Okada et al. ................ | 415/229 |
| 6,024,494 A | | 2/2000 | Buse | |
| 6,612,745 B2 | * | 9/2003 | Nishizaka et al. ........... | 384/297 |

FOREIGN PATENT DOCUMENTS

DE    42 26 986 A1    2/1994
JP    2000060053 A   *   2/2000

* cited by examiner

*Primary Examiner*—Marcus Charles
(74) *Attorney, Agent, or Firm*—Oblon, Spivak, McClelland, Maier & Neustadt, L.L.P.

(57) ABSTRACT

Member for the guidance of a movable piece, including at least one surface in friction and sliding contact with a complementary surface of the movable piece, including several separate ceramic elements carried by a support having resilience characteristics, and for example, made of an elastomer.

26 Claims, 4 Drawing Sheets

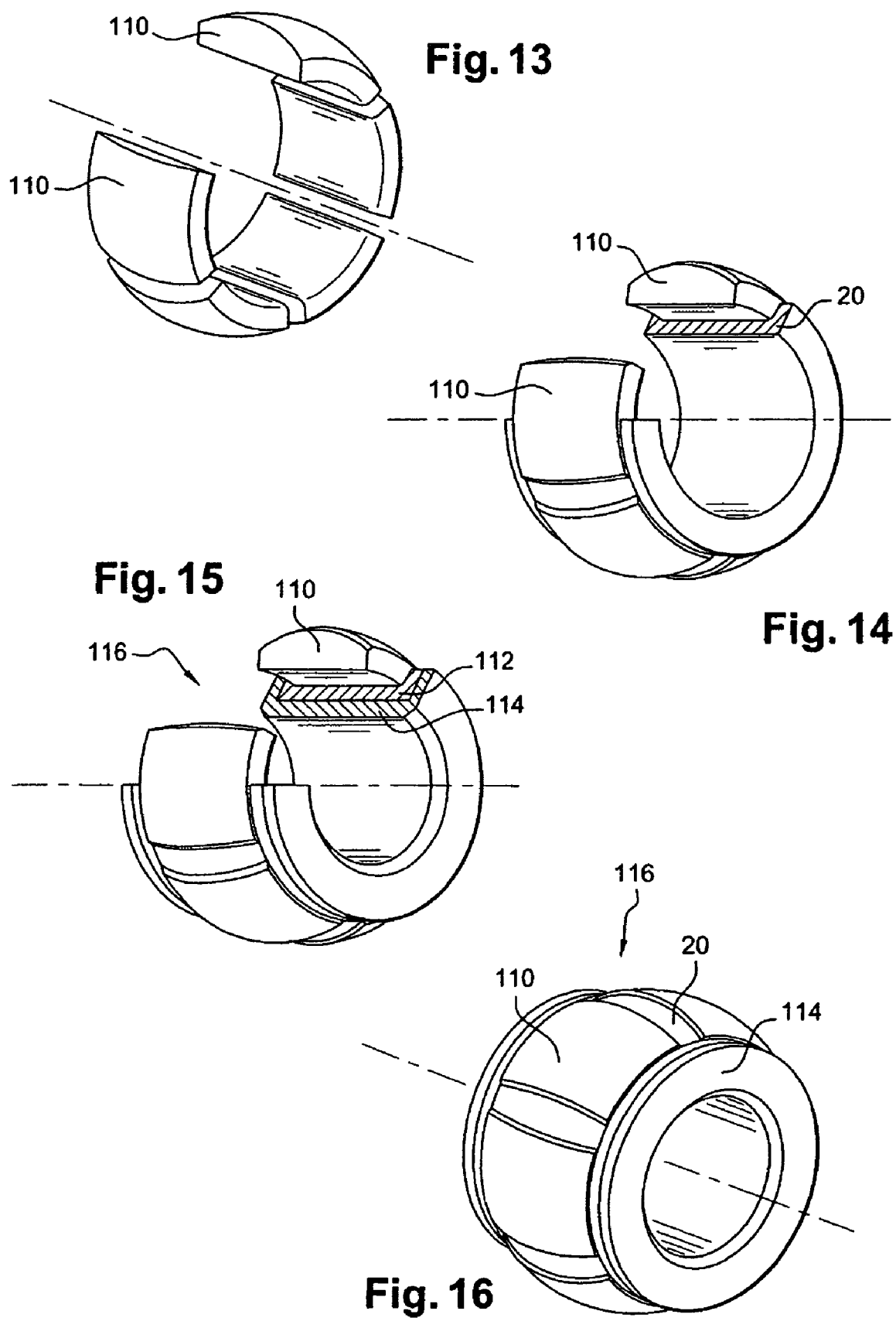

MEMBER FOR THE GUIDANCE OF A MOVABLE PIECE

BACKGROUND OF THE INVENTION

I. Field of the Invention

The present invention relates to a member for the guidance of a movable piece, for example of a shaft or a cylindrical rod movable in rotation and/or in translation, or else of a swiveling piece.

II. Discussion of the Background

It is a known practice to use cylindrical rings to provide a precise positioning of a shaft while providing its guidance in rotation or in sliding. To make the movement easier while reducing the wear of the friction surfaces, materials with a low friction coefficient and a good wear-resistance are used. These materials may form the totality of the rings or be used in thin layers placed on the supports providing a mechanical resistance of the thin layers.

For example it is a known practice to use rings made of metal or metal alloy, such as a bronze alloy, with, in some cases, a surface glaze to improve the sliding of the shaft.

Other rings, usually used dry without additional lubricant, are produced in a single piece of plastic or comprise a metal support or sleeve ensuring the mechanical resistance, with a coating of the guide surfaces with a material with a low friction coefficient.

In certain applications, these rings are subject to severe stresses, for example heavy pressure, high sliding speed or high temperature, often with vibrations and impacts transmitted by the shaft to be guided, which results in rapid wear and a risk of destruction of these rings.

If metal rings are used to reduce the wear and increase the service life, seizing problems are noted eventually.

It has also been proposed to use ceramic rings, this material having a high degree of hardness and a relatively low friction coefficient, for example approximately 0.3, and a very good resistance to many physical or chemical agents.

In addition, these rings are produced by sintering, which allows complex shapes to be produced easily. However they have the disadvantage of having a very high rigidity, a zero elasticity and a fragility to impacts, which poses problems of resilience because these rings do not deform and, in the event of wear, the contact surfaces deteriorate and a functional clearance appears which may lead to the breakage of the rings.

These problems of wear and failure of the anti-friction rings may have consequences particularly in the aerospace industry where the wear and breakage of a bearing may lead to the stoppage or destruction of an engine.

SUMMARY OF THE INVENTION

The main object of the present invention is to provide a simple and effective solution to these problems.

Its subject is a guidance member with a low friction coefficient and a very good wear-resistance, and having in addition a resilience allowing it to accept a certain deformation and to withstand high mechanical stresses.

For this purpose, it proposes a hollow member for the guidance of a movable piece, comprising at least one inner surface intended to come into friction and sliding contact with a complementary surface of the movable piece and one outer friction and sliding surface, characterized in that the contact surfaces of this guidance member consist of separate ceramic elements carried by a support having resilience and damping characteristics.

An essential advantage of the guidance member according to the invention is that it combines a considerable hardness of the surface of contact with the movable piece and a certain resilience which allows it to accept a deformation without risk of breakage. Furthermore, the contact surface is in pieces and formed of elements separate from one another that may be deformed independently, so that this contact surface may withstand different local stresses without problems.

In a preferred embodiment of the invention, the support of the ceramic elements is made of elastically deformable material and is advantageously molded or overmolded onto these elements.

In another embodiment, the support is formed before the mounting of the ceramic elements and consists, for example, of a metal or similar cage.

In both cases, the ceramic elements may have protruding forms for their attachment to the support by crimping or clipping.

According to another feature of the invention, the support of the ceramic elements is slightly recessed relative to the surface defined by these elements, which prevents the support from rubbing on the movable piece.

The ceramic elements may be either in contact both with the movable piece and with a device for supporting this piece, which makes it possible to reduce the number of elements, for example, in the case of a small dimension guidance member, or in contact with only the movable piece or with only the supporting device, which provides a greater elasticity of the guidance member.

The guidance member according to the invention may take various forms. It may consist of an axi-symmetric cylindrical tubular casing capable of guiding a shaft or a cylindrical rod and comprise either ceramic elements extending over substantially the whole length of the tubular casing in the axial direction, or of elements placed successively over the length of the tubular casing, these successive elements being able to be offset angularly relative to one another.

In a variant, the cylindrical tubular casing comprises, at one of its ends, a collar formed by the support and able to comprise ceramic elements on at least one of its faces.

The guidance member according to the invention may also be a washer comprising ceramic plates on at least one of its faces, for example for the axial bearing of a rotary shaft.

The guidance member according to the invention may also be a ball-joint for guiding a movable piece in a swiveling motion, this ball-joint comprising ceramic elements defining a spherical surface.

In a variant embodiment, the guidance member comprises a bushing or a sleeve on its face opposite to that defined by the ceramic elements.

Generally, the support of the ceramic elements may advantageously contribute to the production of a seal with the movable piece or with its supporting device, either directly by interaction of shapes, or indirectly via a seal.

The support of the ceramic elements is for example a silicon elastomer of the RTV type, which withstands high temperatures of the order of 300° C., a metal alloy, a composite material, a polyamide resin, resistant to high temperatures.

A worthwhile application of the invention is an antifriction tubular casing for guiding in rotation a turbojet vane with variable-angle adjustment.

The invention will be better understood and other features and advantages will appear more clearly on reading the following detailed description given as an example and made with reference to the appended drawings in which:

BRIEF DESCRIPTION OF THE DRAWINGS

FIGS. 13 to 16 are views in perspective of the various components of a ball-joint according to the invention.

DETAILED DESCRIPTION OF THE INVENTION

Figure 1:
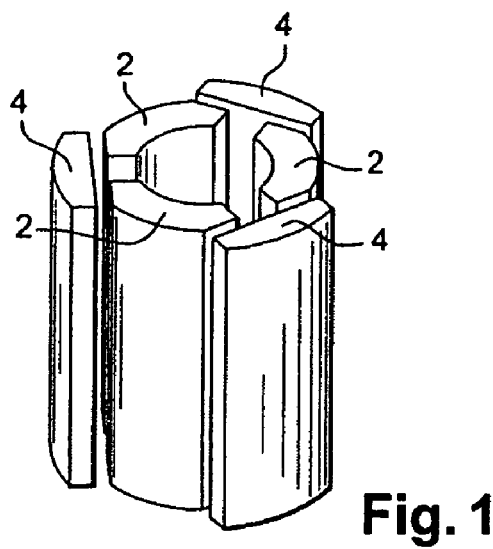
FIG. 1 is a view in perspective of the ceramic elements of a guidance member according to the invention.
Figure 2:
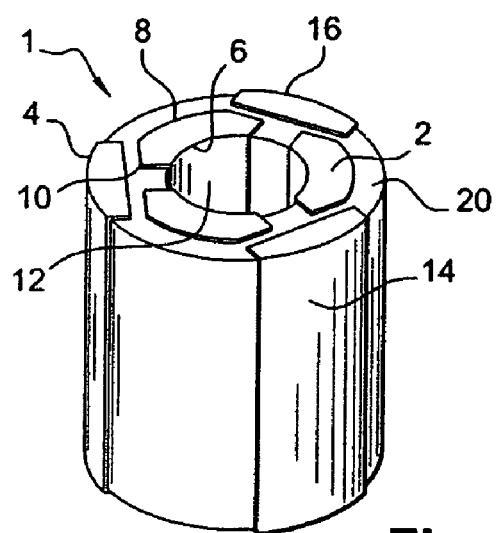
FIG. 2 is a view in perspective of this guidance member.
Figure 3:
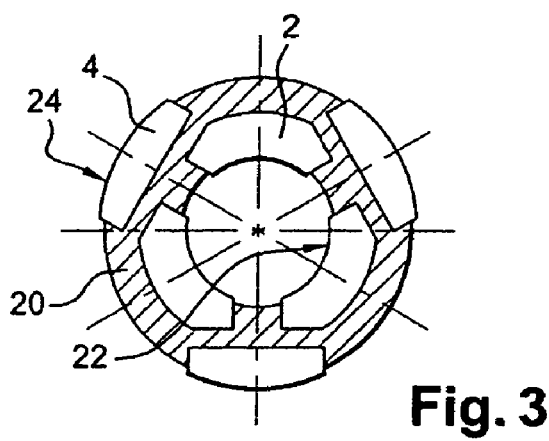
FIG. 3 is a view in cross section of the guidance member of FIG. 2.

In the embodiment shown in FIGS. 1 to 3, the guidance member according to the invention is a smooth bearing 1 for guiding in rotation and/or in translation a shaft or a cylindrical rod. It has an axi-symmetric cylindrical shape comprising an inner surface for guiding the shaft. This bearing comprises two coaxial assemblies, inner and outer, of at least three ceramic elements each, defining an inner cylindrical friction and sliding contact surface and an outer cylindrical friction and sliding contact surface.

A first assembly consists of inner elements 2, the second assembly consists of outer elements 4, formed by ceramic parallelepipedic plates. The inner plates 2 have a constant cross section, defined by an inner arc of a circle 6 and an outer arc of a circle 8. These arcs have the same center situated on the axis of the bearing 1 and they are connected together at their ends by a curved side forming a protruding corner 10. These inner plates 2 are distributed evenly about the axis of the bearing, at 120 degrees from one another. The radii of the inner arcs 6 are equal and the inner surfaces 12 of the plates 2 define an inner cylindrical surface 22 for guiding a shaft (not shown).

The outer plates 4 likewise have an elongated parallelepipedic shape along the axis of the bearing, with a constant section comprising an outer arc of a circle 16. These outer plates 4 are distributed evenly about the axis of the bearing, at 120 degrees from one another. They are offset transversely by 60 degrees relative to the inner plates 2. The radii of the outer arcs 16 are equal and the outer surfaces 14 of the plates 4 define an outer cylindrical surface 24 for guiding or attaching the bearing 1 on a supporting device not shown.

The plates 2, 4 are connected together by a connection material 20 which fills all the volume left free between the inner cylindrical surface 22 and the outer cylindrical surface 24. This connection material is slightly recessed from the inner cylindrical surface 22 and outer cylindrical surface 24 of the bearing 18, this recess, for example of a few tenths of a millimeter, having the effect of ensuring that the connection material 20: does not enter into contact with the shaft to be guided or with the supporting device.

The connection material provides the positioning and the connection of the various plates 2 and 4, by adhesion of the connection material 20 to the plates. This connection may also be supplemented by a mechanical coupling effect in the case where the plates comprise surfaces with negative relief or undercut, such as for example the protruding corner 10, to achieve an anchorage or an embedding of these plates in the connection material 20.

Various solutions may be used for installing the connection material. A simple solution is to produce an overmolding of the material in a mold in which the plates have been positioned. The connection material 20 fills all the free space of the molding volume while providing a good contact with the surfaces of the plates. This material may be a thermoplastic, or thermosetting material or a material that polymerizes by chemical reaction. To ensure the adhesion of these plates, various known means may be used, such as for example a surface treatment of the plates improving the coupling of the connection material. In addition, this material is chosen to have a certain resilience or elasticity and may be made of elastomer, for example a silicon elastomer of the RTV type already used in the aerospace industry and which withstands temperatures of the order of 300° C. or of a polyamide-imide resin.

This bearing is used in the following manner. Its inner cylindrical surface 12 is adjusted on the surface of the shaft to be guided, which is in contact with hard ceramic surfaces providing an effective guidance with a low friction coefficient and low wear. The resilience of the connection material 20 holding the plates provides a particular advantage. These plates, very rigid in themselves, are held slightly flexibly by a material that has energy damping and absorption qualities. Thus, the inner friction surface of the bearing has a certain aptitude to conform itself while following the defects of geometry resulting from the wear of the materials in contact, which prevents the formation of high pressure zones that can be seen in the case of a rigid guidance member.

The connection material 20 allows the inner cylindrical surface 22 to deform locally by relative movement of the plates, without high stresses resulting therefrom. In addition, this resilience allows an energy absorption that may be of value in the case where the guided shaft transmits vibrations or jolts.

Another advantage of this bearing is its capacity to adapt to the device being held. When the outer cylindrical surface of the bearing is mounted tight in a bore, it may absorb production tolerances without generating high stresses.

The outer cylindrical surface of the bearing may also serve as a guidance and friction surface, with the same features and advantages as its inner cylindrical surface. The same applies to the axial end faces of the bearing that may serve for the axial positioning of the guided shaft. The bearing may therefore be attached to a supporting device or left free between two pieces in relative movement.

Figure 4:
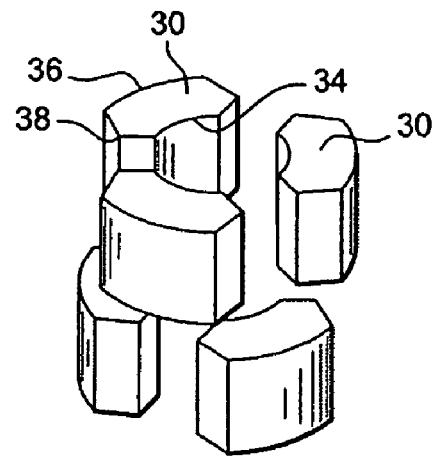
FIGS. 4, 5 and 6 are views similar to those of FIGS. 1, 2 and 3, for a variant embodiment.
Figure 5:
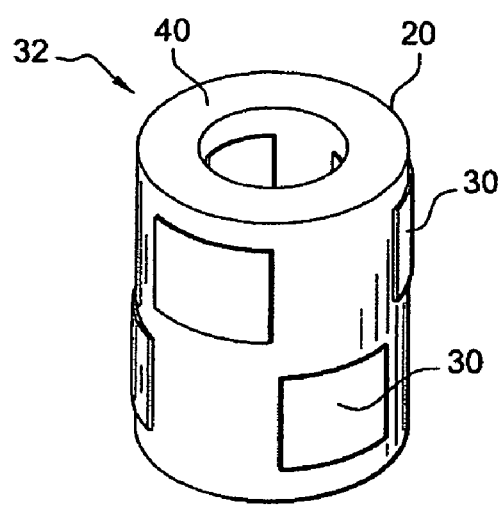
Figure 6:
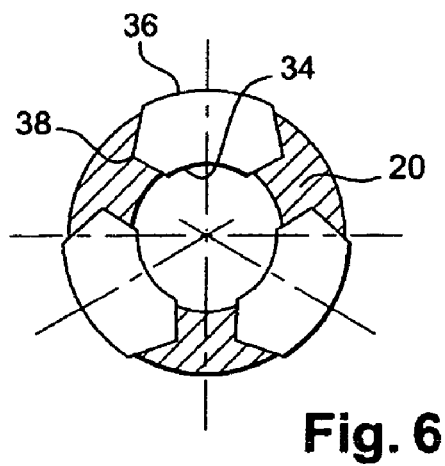

FIGS. 4 to 6 represent a variant embodiment of the bearing, in which, in a similar manner, ceramic plates 30 held by a connection material 20 are six in number and are not offset radially but circumferentially from one another.

The plates 30 each have a length or axial dimension of less than half the axial length of the bearing and are distributed on two axially superposed levels, the plates of one level being offset by 60° relative to the plates of the other level about the axis of the bearing.

Each plate 30 has an elongated shape as a portion of a cylinder along the axis of the bearing 32 and comprises an inner cylindrical face 34 and an outer cylindrical face 36 that are centered on the axis of the bearing. These cylindrical faces are connected together by dihedral lateral faces at the protruding corner 38. The inner faces 34 of the plates define a same axi-symmetric cylindrical surface forming the guide surface of a shaft and the outer faces 36 of these plates define the outer cylindrical surface of the bearing.

As above, the plates are supported and held by a connection material 20 of the aforementioned type. In FIG. 5, the two end faces 40 of the bearing consist only of the connection material 20, unlike the bearing of FIG. 2.

An advantage of this variant is that it creates an additional seal via a chicane due to the angularly offset placement of the plates between the two levels. When the bearing separates two zones in which different pressures exist, it can be expected that fluid will pass between the shaft and the inner cylindrical surface 22 of the bearing. This passing is easier in the case of the bearing of FIG. 2, whose surface 22 comprises rectilinear channels formed between the plates by the slightly recessed connection material, these channels being parallel with the axis and extending over the whole length of the bearing. In FIG. 5, the angularly offset placement of the plates in the two levels creates a chicane effect forcing the fluid to pass round the obstacle and able to limit its flow.

Figure 7:
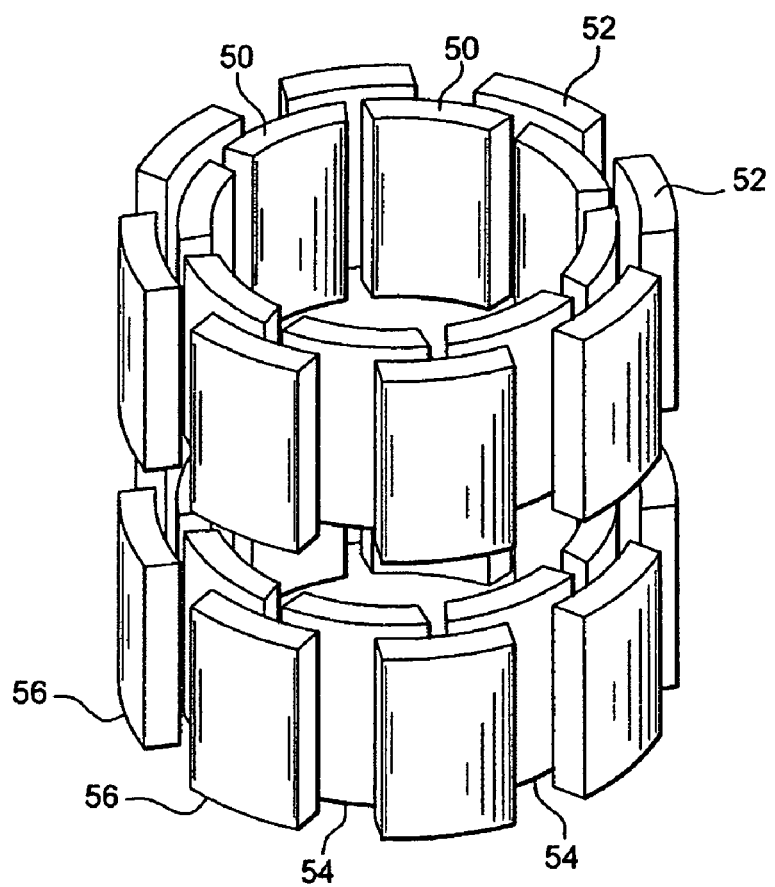
FIG. 7 is a view in perspective of the ceramic elements of another variant.
Figure 8:
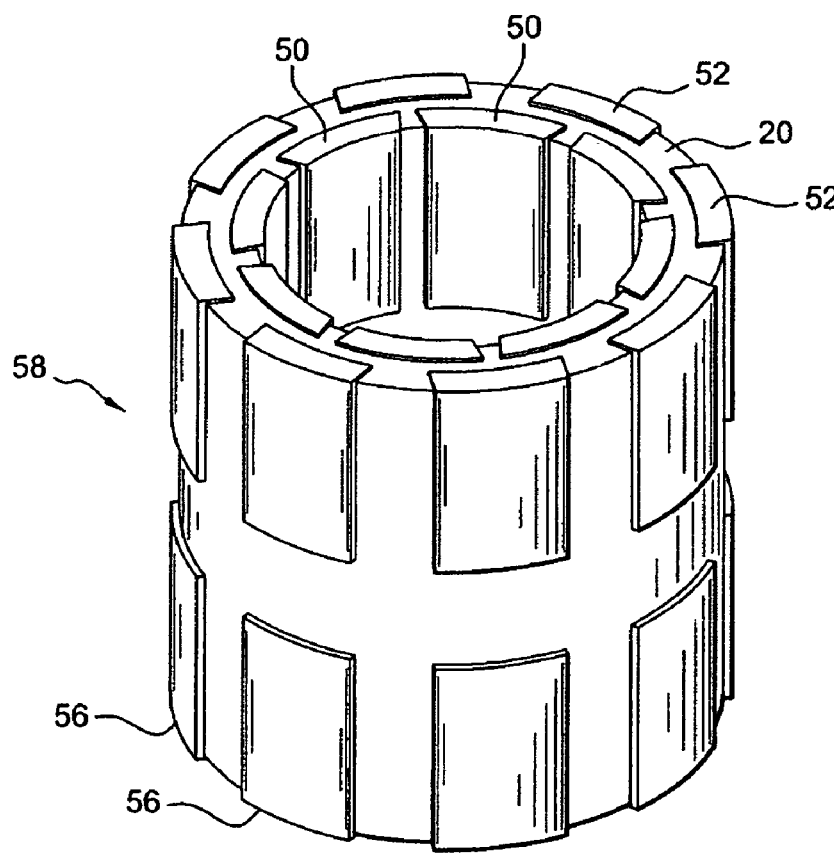
FIG. 8 is a view in perspective of the complete bearing comprising the elements of FIG. 7.
Figure 9:
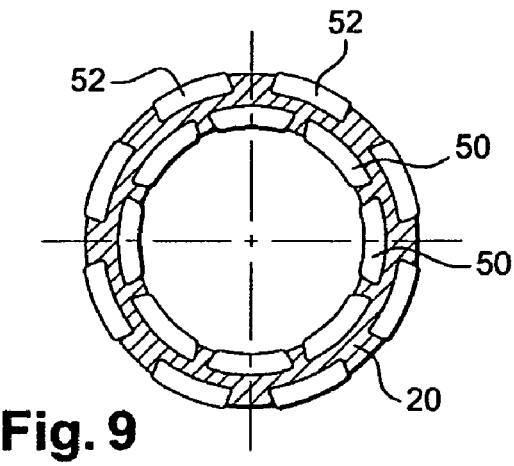
FIG. 9 is a view in cross section of the bearing of FIG. 8.

Another variant is shown in FIGS. 7 to 9 and corresponds to a combination of the two previous embodiments. The bearing 58 of FIG. 8 comprises two levels of axially superposed plates as in FIG. 5 and each of these levels itself comprises an assembly of inner plates 50, 54 and an assembly of outer plates 52, 56, the inner plates being identical to one another, and the outer plates being identical to one another, the numbers of inner plates and outer plates being eight in the example shown. The inner faces of the inner plates 50, 54 and the outer faces of the outer plates 52, 56 form respectively an inner cylindrical surface and an outer cylindrical surface of friction or of connection with a movable piece and with a supporting device.

FIG. 9 shows that the lateral faces of the plates have an undercut shape for the mechanical anchoring of the plates in the connection material.

Figure 10:
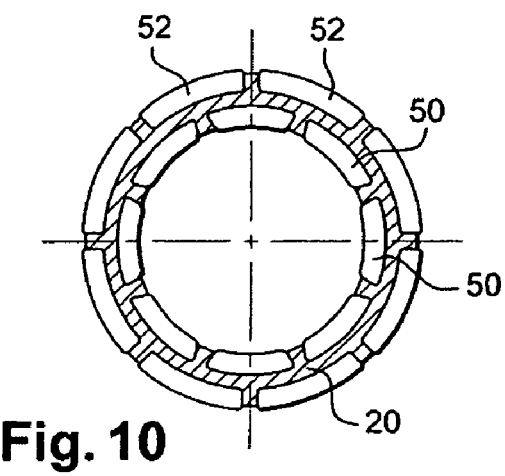
FIG. 10 is a view in section of a variant of the bearing of FIG. 9.

In the variant of FIG. 10, the outer plates 52 have an angular extent greater than that of the inner plates, which increases the proportion of ceramic in the outer cylindrical surface of the bearing. Furthermore, the lateral faces of these plates are flat and radial and do not provide any mechanical coupling in the connection material, other than by adhesion.

The advantage of the variants of FIGS. 7 to 10 is that the bearings having a larger number of smaller plates adapt more easily to local deformations.

These variants also make it possible to produce large sized bearings while retaining small sized plates. The plates of FIGS. 1 to 6 have, for example, an internal diameter of the order of 10 mm while those of FIGS. 7 to 10 may have an internal diameter greater than 15 mm.

Figure 11:
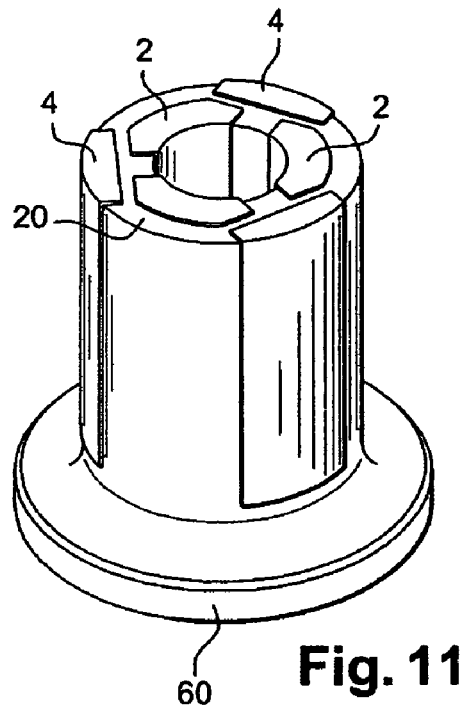
FIG. 11 is a view in perspective of another variant of the bearing of FIG. 2.

FIG. 11 represents a variant of the bearing of FIGS. 1 to 3 which comprises two coaxial assemblies, inner and outer respectively, each of three plates 2, 4, supported by the connection material 20 which also forms a collar at one axial end of the bearing.

This collar may have several functions: it may serve as a bearing face attached to a support of the bearing, its larger surface making the connection easier. It may also itself be furnished with ceramic plates on a flat face, plates held in the same manner by adhesion or by a mechanical coupling effect on the connection material. It may also serve for the bearing and friction of an axially guided rotary shaft, with a large surface area to reduce the pressures of contact.

This collar may also serve for sealing. In the case where the bearing is attached in a cylindrical housing of a support, a sealing element, such as a seal may be pressed via the face of the collar turned towards the support, the other flat face of the collar optionally serving as a friction face.

Other sealing means may be provided on the bearing according to the invention, by using for example the molding of the connection material to give it complex shapes serving as the contact seal, by forming a chicane or via a complementary element such as a fixed or rotating seal.

Figure 12:
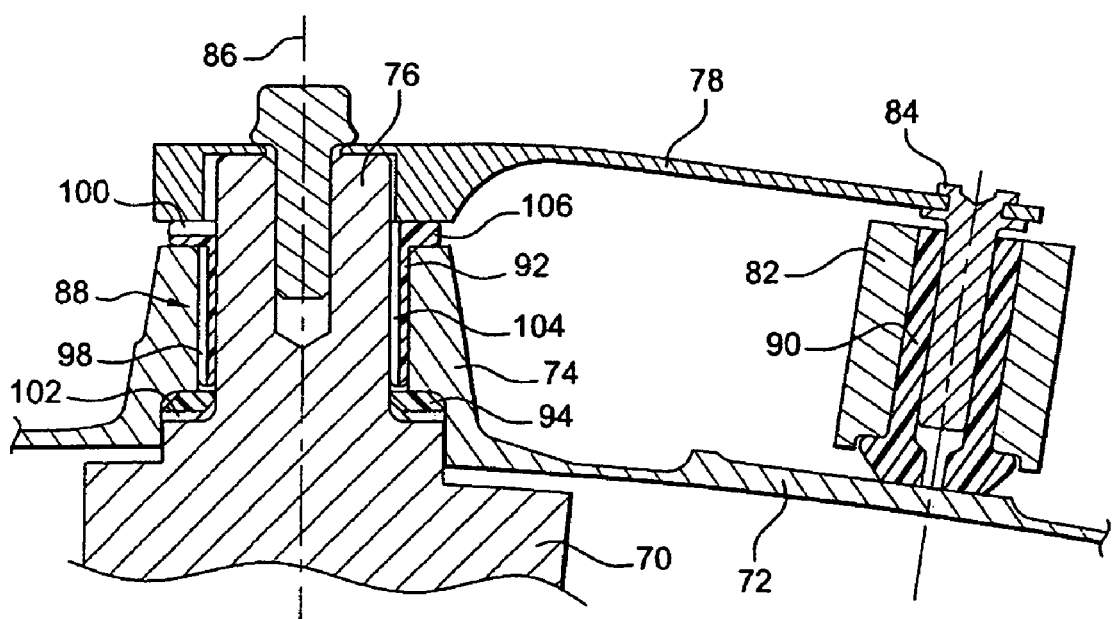
FIG. 12 is a schematic view in section of the means of driving a variable adjustment vane in a turbojet.

FIG. 12 represents an example of use of a smooth bearing according to the invention, for the mounting in pivoting manner of a vane 70 with variable-angle adjustment in a turbojet. These vanes are used to reshape a high temperature gaseous flow, and are subject to severe stresses (high temperature, chemical compatibility with the gases, heavy loads). The system must remain totally reliable throughout the period of use between two services, without clearance or risk of breakage.

The vane 70 is guided in a column 74 of a gearcase 72 by a bearing 88 which allows a pivoting movement of the vane 70 while ensuring that it is axially adjusted. The angular position of the vane 70 is controlled by a rod 78 rigidly attached to the shank 76 of the vane 70. The other end of the control rod 78 is driven by a control ring 82 by means of a metal finger 84 guided in a tubular casing 90 mounted on the ring 82, the latter acting simultaneously on different rods to control all the vanes 70 of at least one reshaping stage.

The bearing 8 for guidance of the vane shank 76 comprises a tubular casing 92 with a collar 106 corresponding to the embodiment of FIG. 11 and a washer 94. The axially elongated portion of the tubular casing 92 is inserted into a bore of the column 74 and comprises inner plates 104 and outer plates 98 supported by a connection material of the aforementioned type.

The axial guidance of the vane 70 relative to the gearcase 72 is provided with a light friction and a good reliability by the collar 106 of the tubular casing 92 and by the washer 94. The collar 106 comprises ceramic plates 100 forming a flat annular surface bearing on the control rod 78 and providing the friction with the latter. The washer 94 also comprises ceramic plates 102 forming a flat annular surface bearing on a shoulder formed at the junction between the shank 76 and the vane 70. This axial guidance is mounted with a small axial functional clearance or with a slight axial prestress. This guidance is, like the guidance in rotation, subject to pressures and impacts. The use of ceramic plates mounted on a resilient material is therefore totally appropriate.

FIGS. 13 to 16 represent a variant embodiment relative to a ball-joint having a spherical guidance surface. This ball-joint comprises a series of identical ceramic plates 110, with an even angular distribution about an axis and a circumferential clearance between them. The inner faces of these plates 110 define a cylindrical surface and their outer faces define a surface in a segment of a sphere. These plates each have two lateral flat faces between their spherical and cylindrical faces.

These plates are supported and connected together by the connection material 20. By adhesion the latter holds the plates and provides the connection with an inner metal sleeve 114 which is of axi-symmetric cylindrical shape and comprises two collars at its axial ends. The connection material fills a cylindrical space 112 left free between the sleeve 114 and the plates 110, the circumferential clearances between the plates and the flat annular spaces being situated between the axial ends of the plates and the collars. This material is put in place, for example, by overmolding on the plates and the sleeve previously placed in a mold. As for the preceding embodiments, a slight recess of the surface of the connection material relative to the outer surfaces of the plates is provided to ensure that the piece to be guided is resting exclusively on the plates.

In general, a guidance member according to the invention consists of ceramic plates separated from one another and supported by a material having a certain resilience and a damping capacity. According to the invention, use may be made of any connection material having the desired resilience and damping qualities, for example a metal alloy, a composite, a polyamide resin, an elastomer or other material. As a variant, a supporting cage may be used, formed of a metal sheet and comprising means of coupling the plates, for example clipping hooks and forms providing a relative elasticity between the support and the plates, for example folds of the metal sheet.

Furthermore, the plates described hereinabove have friction surfaces with a generally rectangular contour, but could have different, for example rounded, contours.

The invention claimed is:

1. A hollow guidance member for guiding a work piece, comprising:
    at least three separate inner ceramic elements, at least three separate outer ceramic elements, and a support fastened to sides of the separate inner and outer ceramic elements, wherein inner surfaces of the separate inner ceramic elements and inner surfaces of the support form a bore in the hollow guidance member, and wherein outer surfaces of the separate outer ceramic elements and outer surfaces of the support form an exterior of the hollow guidance member.

2. The hollow guidance member according to claim 1, wherein the support is made of elastically deformable material molded onto the separate inner and outer ceramic elements.

3. The hollow guidance member according to claim 1, wherein the support is a modular piece formed before the separate inner and outer ceramic elements are mounted.

4. The hollow guidance member according to claim 1, wherein the separate inner and outer ceramic elements have protruding shapes for fastening to the support by crimping or clipping.

5. The hollow guidance member according to claim 1, wherein at least some of the separate inner and outer ceramic elements define an inner contact surface and an outer contact surface.

6. The hollow guidance member according to claim 1, wherein the bore in the hollow guidance member guides the work piece and the exterior of the hollow guidance member is adapted to a supporting device.

7. The hollow guidance member according to claim 1, wherein the support comprises a rigid sleeve.

8. The hollow guidance member according to claim 1, wherein the support comprises a resilient and dampening material.

9. The hollow guidance member according to claim 1, wherein the separate inner and outer ceramic elements are plates with at least one flat face.

10. The hollow guidance member according to claim 1, wherein the separate inner and outer ceramic elements and the support form an axi-symmetric cylindrical tubular casing capable of guiding the work piece.

11. The hollow guidance member according to claim 1, wherein the separate inner and outer ceramic elements extend over a whole axial length of the hollow guidance member.

12. The hollow guidance member according to claim 1, further comprising separate inner and outer ceramic elements placed successively over an axial length of the hollow guidance member, the separate inner and outer ceramic elements offset angularly relative to one another.

13. The hollow guidance member according to claim 1, wherein one end of the support forms a collar.

14. The hollow guidance member according to claim 13, wherein the collar comprises ceramic elements on at least one face of the collar.

15. The hollow guidance member according to claim 1, wherein the separate inner and outer ceramic elements and the support form a washer.

16. The hollow guidance member according to claim 1, wherein the support also forms a seal with the work piece directly by interaction of shapes.

17. The hollow guidance member according to claim 1, wherein the separate inner and outer ceramic elements and the support form a bearing for guiding in rotation a turbojet vane with variable-angle adjustment.

18. The hollow guidance member according to claim 1, wherein the separate inner and outer ceramic elements and the support form a ball-joint for guiding a swivel-motion piece, the separate inner and outer ceramic elements defining spherical surfaces.

19. The hollow guidance member according to claim 1, wherein the separate inner and outer ceramic elements are parallelepipedic blocks with at least one flat face.

20. The hollow guidance member according to claim 1, wherein the separate inner and outer ceramic elements are parallelepipedic blocks with at least one curved face.

21. The hollow guidance member according to claim 1, wherein the separate inner and outer ceramic elements are comprised of the same material.

22. The hollow guidance member according to claim 1, wherein the separate inner and outer ceramic elements are connected to the support only by a mechanical coupling effect.

23. The hollow guidance member according to claim 1, wherein the separate inner ceramic elements are equally radially spaced from a center axis passing through the bore in the hollow guidance member, and the separate outer ceramic elements are equally radially spaced from the center axis.

24. The hollow guidance member according to claim 23, wherein the separate inner ceramic elements are circumferentially positioned equally around the center axis, and the separate outer ceramic elements are circumferentially positioned equally around the center axis.

25. The hollow guidance member according to claim 24, wherein each separate outer ceramic element is circumferentially positioned equally between two separate inner ceramic elements.

26. A hollow guidance member for guiding a work piece, comprising:
    at least three separate inner ceramic elements, at least three separate outer ceramic elements, and a support fastened to sides of the separate inner and outer ceramic elements, wherein inner surfaces of the support are recessed relative to inner surfaces of the separate inner ceramic elements and outer surfaces of the support are recessed relative to outer surfaces of the separate outer ceramic elements.

* * * * *